May 4, 1937.   R. D. MERSHON   2,079,081
ELECTROLYTIC APPARATUS
Filed Oct. 23, 1935
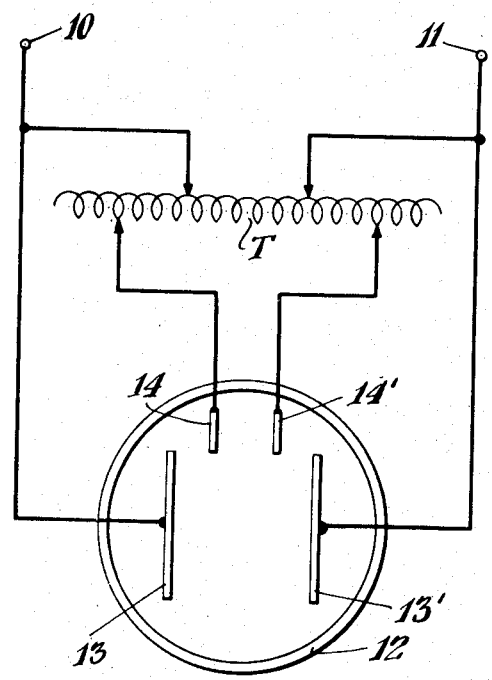
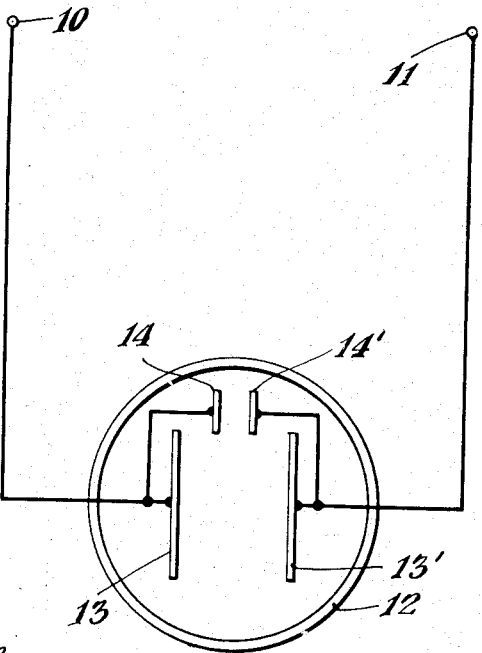
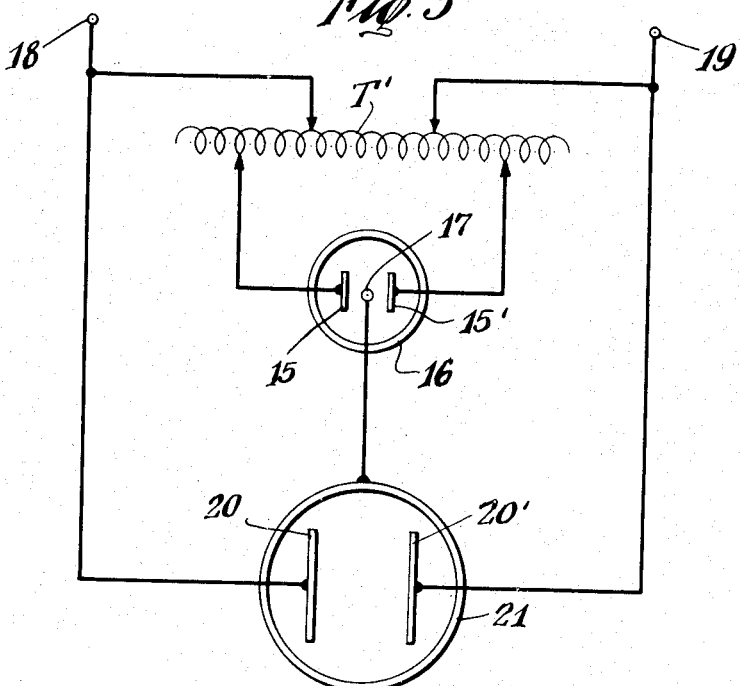
INVENTOR
Ralph D. Mershon
BY
Cooper, Kerr and Dunham
ATTORNEYS Patented May 4, 1937

2,079,081

UNITED STATES PATENT OFFICE 2,079,081

ELECTROLYTIC APPARATUS

Ralph D. Mershon, Greenwich, Conn.

Application October 23, 1935, Serial No. 46,253

9 Claims. (Cl. 175—315)

This invention relates to electrolytic apparatus employing filmed electrodes, for example electrolytic condensers having aluminum anodes. In such condensers the "power factor" is an important item in the operation of the apparatus and accordingly a low power factor is an important desideratum, since the lower the power factor the smaller the "losses" in the operation of the device and hence the greater its efficiency. I have therefore been led to devise my present invention, which has for an important object the provision of an electrolytic condenser or rectifier in which the losses are low and will remain low (that is, will not materially increase) in the operation of the device.

In the course of extensive experience in the art of electrolytic condensers and rectifiers I have found that a substantial improvement in the power factor of the condenser and in the efficiency of the rectifier can be obtained by the addition to the electrolyte of aluminum hydroxid, preferably colloidal, and a compound of an alkali earth metal, such as an oxid, hydroxid or carbonate; or the addition of compounds which are formed by reaction of the alkali earth metal compound with a constituent of the electrolyte. The CaO or other alkaline earth compound, and the aluminum hydroxid, may be added simultaneously or either before the other, and the aluminum hydroxid may be added as such, or, especially the colloidal form, may be added by forming it electrolytically in the electrolyte (before or after the alkali earth compound is added) by passing current through the electrolyte from an aluminum anode, preferably one of high purity.

The filmed electrodes are "formed" (i. e., filmed) in an electrolyte to which aluminum hydroxid has been added, or, preferably, in one to which both colloidal hydroxid and a calcium compound of the class indicated have been added.

For the best results I use as electrolyte a boraxboric acid solution, for example one containing per liter of water 180 grams of boric acid and 60 grams of anhydrous sodium tetraborate. All ingredients, including the water, should be pure, particular care being taken to avoid the presence of any chlorin or sulfur compound. To this I add colloidal aluminum hydroxid, preferably all that the electrolyte will hold in solution or suspension, and a little more, to insure saturation; and from about 2 to about 12.5 grams (preferably not more than 10) of a calcium compound, calculated as CaO, per liter. If pure colloidal hydroxid, free from chlorin and sulfur compounds, is not otherwise available, it may be formed electrolytically in the electrolyte by passing current therethrough from an aluminum anode. One method for the purpose is to immerse two aluminum plates in the solution and pass direct current from one as anode to the other as cathode, the current being of rather low density. The current is reversed periodically, making the plates alternately anode and cathode. This process results in the formation of a gelatinous form of aluminum hydroxid, which gives the solution a bluish color by transmitted light, and the process is kept up until non-colloidal aluminum hydroxid begins to come down and make the solution cloudy. To this I add the lime or other calcium compound, whereupon a reaction ensues, in which, I believe, calcium aluminate, calcium borate, and calcium boro-aluminate, are formed, the solution becoming more or less opaque and milky. The calcium compounds thus formed are sparingly soluble and hence may appear as a precipitate. Any loss of borax or boric acid may be made up by addition of the same if desired. If the calcium compound is added to the "raw" electrolyte, that is, before the treatment by which the aluminum hydroxid is formed, the latter appears to react about as fast as it is formed, so that the "blue" test is not always available. If not, the treatment described should be continued for a time which would, with an electrolyte free from calcium compound, give the blue color referred to. A longer time of treatment does no harm and is sometimes beneficial.

The electrolyte is now ready for use in a condenser or rectifier, but the filmed electrodes used in it should be filmed in the electrolyte itself or a similar one; or in one containing colloidal aluminum hydroxid, preferably in amount sufficient to give the blue color. For condensers the anodes are usually unalloyed aluminum. For rectifiers better results are obtained with the aluminumalloy electrodes described in my prior Patents Nos. 1,889,415, 1,889,417, and 1,908,039, especially the electrodes of the two last-mentioned patents, made of aluminum-cadmium and aluminumcalcium alloy. By preference, though not necessarily, the alloy contains by weight at least about 5 per cent of cadmium or 3 per cent of calcium, and 2 per cent of nickel. Of the latter metal as much as 6 per cent may be used and even more, but in general about 4 per cent gives as good results as a larger amount. More than about 9.4 per cent of cadmium or 10 per cent of calcium does not appear to be of material advantage but as much of either may be present as can be alloyed with aluminum or with aluminum and nickel. A good average amount is about 8.5 per cent of cadmium or 8 per cent of calcium. Some or all of the nickel may be replaced by one or more of the elements copper, cobalt, silicon. The preferred compositions are, approximately, aluminum 87.7, cadmium 8.7, nickel 3.6 per cent; and aluminum 88, calcium 8, nickel 4 per cent.

For a non-filming rectifier electrode, graphite, carbon or a suitable non-filming metal may be used, preferably one which is not readily deposited on the filmed electrodes, as for example high-silicon iron. The metal tank or vessel containing the electrolyte may be used as the non-filming electrode, as is common in the art.

In the accompanying drawing I have shown diagrammatically several electrolytic devices in which the present invention is used; with the understanding, however, that the invention is not limited to the specific devices shown but may be applied with advantage to electrolytic condensers and rectifiers generally.

In the drawing,

Fig. 1 illustrates an electrolytic condenser, "excited" by a full-wave electrolytic rectifier in the same tank, with an autotransformer for impressing a higher alternating voltage on the rectifying electrodes than on the condenser anodes.

Fig. 2 illustrates an electrolytic condenser and a full-wave rectifier in the same tank to excite the condenser, with the same alternating voltage impressed on the rectifying electrodes as on the condenser electrodes.

Fig. 3 illustrates an electrolytic condenser excited by an external rectifier.

In Figs. 1 and 2, the terminals for connecting the apparatus with an alternating current circuit are marked 10 and 11. The tank or vessel containing the electrolyte is shown at 12. The condenser electrodes (anodes) 13, 13' are connected to the terminals 10, 11, and the rectifier electrodes 14, 14', giving full-wave rectification, are connected to the same terminals, directly in Fig. 2 but through a step-up autotransformer T in Fig. 1, so that in the latter figure the voltage impressed on the rectifying electrodes is higher than on the condenser anodes 13, 13'. It is explained in Mershon Patent 1,077,628, issued November 4, 1913, that an electrolytic condenser in operation has its electrolyte negative with respect to the anodes, and that in the absence of other means for the purpose the negative charge is supplied initially and afterwards maintained by a rectifying action of the anodes. This rectifying action involves corrosion of the anodes due to repeated break-down ("perforation") and re-formation of the anode films. In the apparatus illustrated in Figs. 1 and 2 this rectifying action is performed (that is, the condenser is excited) by the rectifier electrodes 14, 14', which, together with the electrolyte in which they are immersed, constitute in one sense an auxiliary condenser. Thus in Fig. 1, assume an impulse of alternating voltage and current coming in on terminal 10. Since the difference of potential between electrodes 14 and 14', and between anode 13 and electrode 14', is greater than between anodes 13 and 13', the leakage current from 13 and 14 will flow to 14' rather than to 13', thereby relieving the latter of the break-down of its film which would occur if the leakage current went to anode 13'. In Fig. 2, if the direction of the alternating current is from terminal 10 to terminal 11, current leakage through the film on anode 13 will find an easier path to the rectifier electrode 14' than to the other anode 13', the film on the alloy electrode 14' being more easily perforated by the current than is the film on the anode 13' made of unalloyed aluminum. Hence the anode films are subject to little if any break-down due to flow of leakage current from the electrolyte. In other words, the anodes are always positive with respect to the electrolyte, less such voltage drop as may occur between the anodes and the rectifier electrodes. The same is true for the device shown in Fig. 1.

In Fig. 3 the rectifier electrodes 15, 15' are in a separate vessel 16 and the apparatus is provided with a non-filming electrode 17 immersed in the electrolyte. The electrodes are connected to the condenser terminals 18, 19 (to which the condenser anodes 20, 20' are connected), through the autotransformer T'. The non-filming electrode 17 is connected to the condenser tank 21, which is made of non-filming conducting material and constitutes the cathode of the condenser. Assuming an impulse of alternating current coming in on terminal 18 the leakage current from condenser anode 20 flows through the electrolyte to the vessel 21, thence to non-filming electrode 17 and from the latter through the electrolyte (in vessel 16), filming electrode 15' and the autotransformer to terminal 19. Thus the anodes 20, 20' are always positive with respect to the electrolyte, as in the case of Figs. 1 and 2.

In the foregoing apparatus two filmed rectifier electrodes are used, and two filmed condenser anodes, but it is well understood in the art that a rectifier need have only one such electrode and a condenser only one filmed anode.

As an instance of the improvement effected by the present invention a condenser may be cited having aluminum hydroxid (both colloidal and non-colloidal) in its electrolyte and anodes which had been filmed in an electrolyte containing such hydroxid. The power factor was 4.26. After addition of lime to the electrolyte the power factor fell to 3.64, a decrease of 14 per cent of its initial value. In another condenser, colloidal aluminum hydroxid and lime were added to the electrolyte, anodes were then filmed in the electrolyte, and afterwards operated in it. At first the power factor was about 3, falling later to 2.7. In another case calcium carbonate was used instead of lime, with a power factor of 2.6 after more than 1600 hours of continuous operation.

So far the invention has been specifically described with the use of calcium compounds, of which lime is representative, but it has been found that compounds of the other alkaline earth metals, particularly barium, strontium and magnesium, may be used with good results. Lithium compounds may also be used. Calcium compounds are preferred, however.

It is to be understood that the invention is not confined to the specific practice herein described but may be practiced in other ways without departing from its spirit.

I claim—

1. In the art of electrolytic apparatus of the class described, the improvement comprising adding lime and aluminum hydroxid to a borax-boric acid electrolyte, filming one or more aluminum electrodes in a borax-boric acid electrolyte to which aluminum hydroxid has been added, and operating at least one such filmed electrode in the first mentioned electrolyte.

2. In the art of electrolytic apparatus of the class described, the improvement comprising adding lime and aluminum hydroxid to a borax-boric acid electrolyte, filming one or more aluminum electrodes therein, and thereafter operating at least one such filmed electrode in said electrolyte.

3. An electrolytic condenser comprising a borax-boric acid electrolyte to which aluminum hydroxid and lime have been added; and aluminum anodes in the electrolyte, filmed in a borax-boric acid electrolyte to which colloidal aluminum hydroxid has been added.

4. An electrolytic condenser comprising a borax-boric acid electrolyte to which colloidal aluminum hydroxid and lime have been added; and aluminum anodes in the electrolyte, filmed in a borax-boric acid electrolyte to which colloidal aluminum hydroxid and lime has been added.

5. An electrolytic apparatus of the class described, having a borax-boric acid electrolyte containing calcium aluminate, calcium borate and calcium boro-aluminate.

6. An electrolytic rectifier having a borax-boric acid electrolyte containing calcium aluminate, calcium borate and calcium boro-aluminate, and having a filmed electrode composed of aluminum-calcium alloy having a calcium content from about 3 per cent to about 10 per cent.

7. An electrolytic rectifier having a borax-boric acid electrolyte containing calcium aluminate, calcium borate and calcium boro-aluminate, and having a filmed electrode composed of aluminum-calcium alloy having a calcium content of from about 3 per cent to about 10 per cent and containing from about 2 per cent to about 6 per cent of nickel.

8. In the art of electrolytic apparatus of the class described, the improvement comprising adding to a borax-boric acid electrolyte a compound of the class composed of oxide, hydroxide and carbonate of an element of the class composed of the alkaline earth elements and lithium; filming one or more aluminum electrodes in a borax-boric acid electrolyte to which aluminum hydroxide has been added, and operating at least one such filmed electrode in the first mentioned electrolyte.

9. In the art of electrolytic apparatus of the class described, the improvement comprising adding to a borax-boric acid electrolyte colloidal aluminum hydroxide and a compound of the class composed of oxide, hydroxide and carbonate of an element of the class composed of the alkaline earth elements and lithium; filming one or more aluminum electrodes in a borax-boric acid electrolyte to which colloidal aluminum hydroxide has been added; and operating at least one such filmed electrode in the first mentioned electrolyte.

RALPH D. MERSHON.